May 31, 1927.  C. BETHEL  1,630,369
BEARING
Filed Nov. 5, 1923     4 Sheets-Sheet 1

WITNESSES:

INVENTOR
Claude Bethel
BY
ATTORNEY

May 31, 1927.

C. BETHEL 1,630,369

BEARING

Filed Nov. 5, 1923

WITNESSES:

INVENTOR
Claude Bethel
BY
ATTORNEY

May 31, 1927.  
C. BETHEL  
1,630,369  
BEARING  
Filed Nov. 5, 1923  
4 Sheets-Sheet 3

WITNESSES:

INVENTOR  
Claude Bethel  
BY  
ATTORNEY

May 31, 1927.

C. BETHEL

BEARING

Filed Nov. 5, 1923    4 Sheets-Sheet 4

1,630,369

WITNESSES:

INVENTOR
Claude Bethel
BY
ATTORNEY

Patented May 31, 1927.

1,630,369

UNITED STATES PATENT OFFICE.

CLAUDE BETHEL, OF WILKINSBURG, PENNSYLVANIA, ASSIGNOR TO WESTINGHOUSE ELECTRIC & MANUFACTURING COMPANY, A CORPORATION OF PENNSYLVANIA.

BEARING.

Application filed November 5, 1923. Serial No. 672,707.

My invention relates to bearings and it has special relation to sleeve bearings for railway service.

In the copending application of C. Bethel and E. Tidlund, Serial No. 665,358, filed September 28, 1923, patented April 28, 1925, No. 1,535,560, and assigned to the Westinghouse Electric and Manufacturing Company, is described a sleeve bearing comprising a hermetically closed oil reservoir having at its lower portion an opening communicating with an oil well from which the oil is supplied to the bearing journal by means of a capillary feeding wick. The quantity of oil which is thus supplied to the bearing depends on the oil lifting height of the well and is sensitive to variations of the oil level in the oil well.

I have found that the expansion of the air or gas which is trapped in the oil reservoir above the oil level may cause considerable variations of the oil level in the well and thus affect the rate of oil-supply to the bearing journal in an undesirable manner.

One object of my invention is to provide an oil-supply system of the above-described character wherein the variations of the oil-supply level are substantially eliminated.

A more specific object of my invention is to provide an oil-expansion chamber communicating with the oil well for increasing the active area of the oil well, in bearings of the above-described character.

A further object of my invention is to provide means for preventing the fibrous capillary oil feeding means, which are disposed in the oil well proper, from entering the oil expansion chamber adjacent to the oil well.

A still further object of my invention is to provide a bearing of the above-described character wherein the oil supply level may be arranged at any desirable height.

With the foregoing and other objects in view, my invention consists in the arrangements and details of construction described and claimed hereinafter and illustrated in the accompanying drawing, wherein Figure 1 is a transverse sectional view of a bearing housing provided with an expansion chamber according to my invention;

Figure 1:
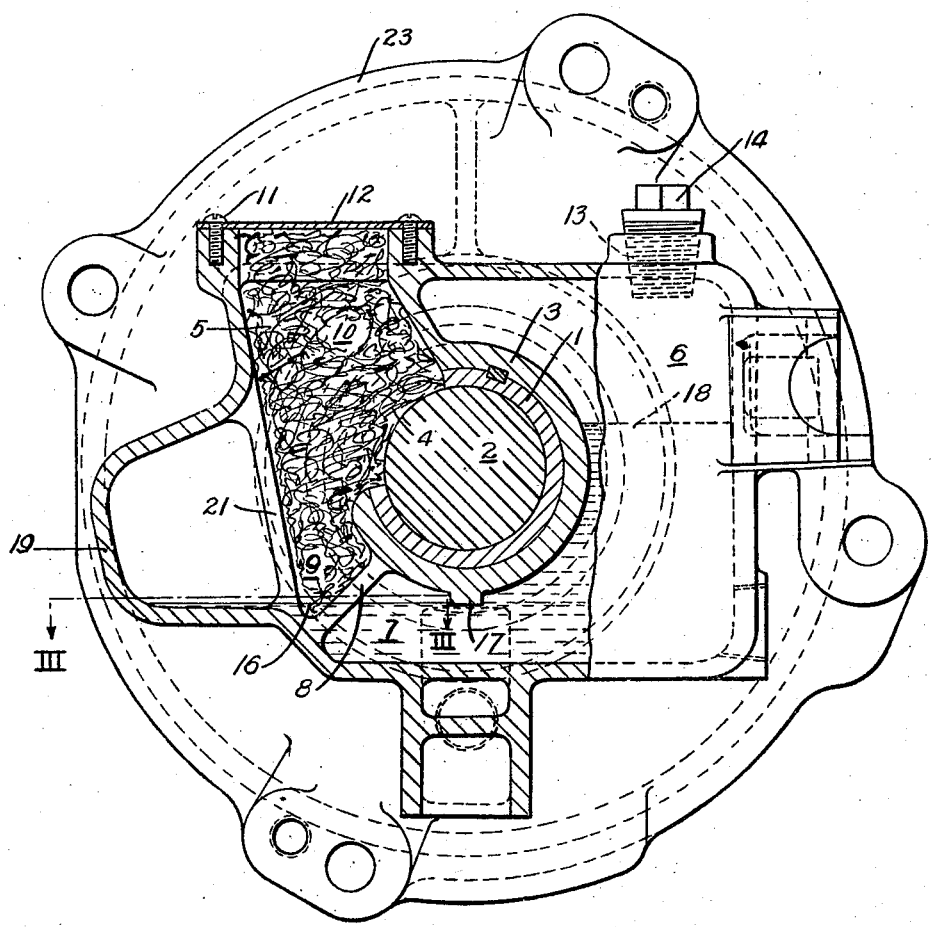
Figure 2:
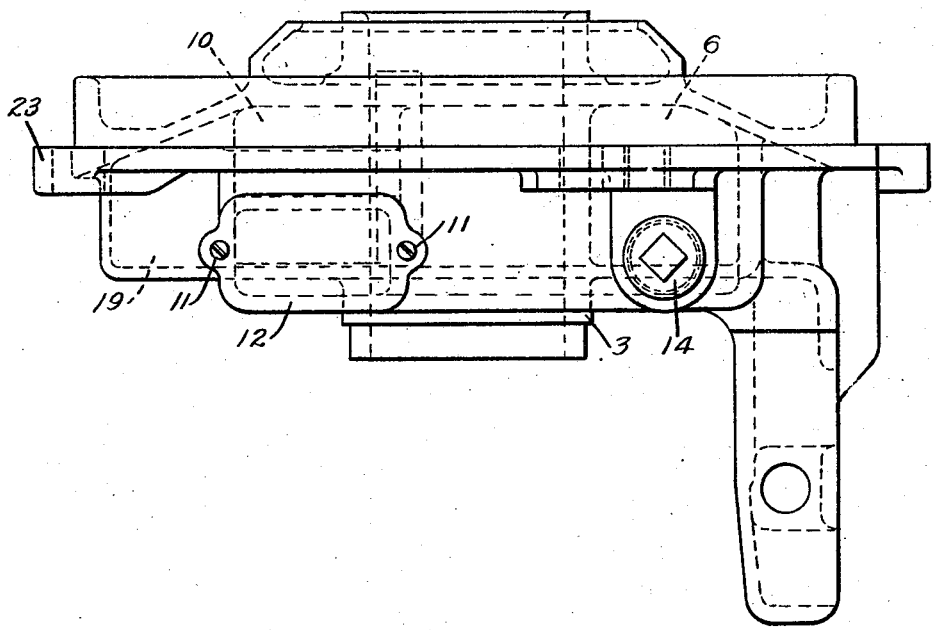
Fig. 2 is a plan view on the bearing shown in Fig. 1.
Figure 3:
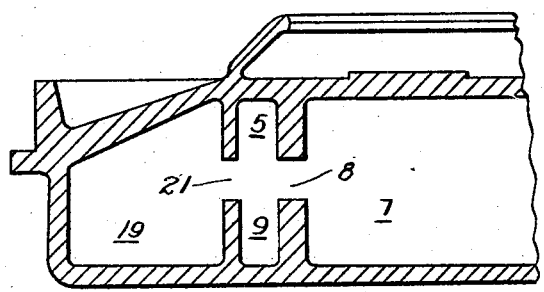
Fig. 3 is a horizontal sectional view along the line III—III of Fig. 1, illustrating the communicating passages between the oil reservoir, the oil supply well and the oil expansion chamber.

In Figs. 1, 2 and 3 is shown a bearing housing comprising a bearing sleeve 1 surrounding a journal 2 of a rotating machine. The bearing sleeve is mounted in a bearing collar 3 which is formed in the bearing housing and has an opening 4 registering with a lubricating chamber 5 which occupies one side of the housing. The other side of the housing is occupied by an oil reservoir 6 which is formed integrally with the bearing housing and communicates, through a passage 7 under the bearing collar 3, with an opening 8 leading to the lower portion of the lubricating chamber 5 and constituting the oil-supply well or feeding chamber 9 of the bearing. The lubricating chamber is tightly packed with a waste 10, or similar capillary oil feeding means, which may be removed or renewed by unscrewing bolts 11 which secure a cover 12 enclosing an opening in the upper portion of the lubricating chamber 5. A filling hole 13 which is disposed in the top wall of the oil reservoir 6 is hermetically closed by means of a pipe plug 14.

By means of the capillary feeding action of the fibrous oil-feeding means 10, the oil is carried from the oil level 16 in the oil-supply well 9 through the lubricating opening 4 in the bearing sleeve and thence to the bearing journal 2. The amount of lubricant which is thus supplied to the journal 2 is determined by the total cross-sectional area of the capillary feeding means at the supply level of the oil well, the lifting height of the capillary oil feeding means, i. e. the difference in the levels of the oil supply opening 4 and the oil supply level 16, and the viscosity and other properties of the lubricating oil, the latter being principally determined by the lubricating requirements of the journal.

The oil level 16 in the well 8 is fixed by the highest level of the communicating passage 7 and, in order to arrange the level at a desired height, I provide a rib 17 extending downwardly from the lower portion of the bearing collar 3. A decrease of the oil level 16 permits the passage of air bubbles under the rib 17 into the space above the level 18 of the oil in the oil in the reservoir 6, displacing a corresponding amount of oil from the reservoir until the level 16 reaches the height of the lowest edge of the rib 17. The arrangement of the rib 17 for determining the oil supply level 16 permits the design of bearings having any desired level height without the necessity of making extensive changes in the bearing construction, a feature which is very important in manufacture and, particularly, in providing the molds for the bearing housing castings.

As mentioned hereinbefore, it has been found that, in case there is an appreciable volume of air or gas in the space above the oil level 18 of the oil reservoir 6, the trapped gas volume may expand excessively by reason of abnormal temperature changes and displace a large quantity of oil from the oil reservoir, thereby raising the oil-supply level 16. Such displacement of the oil in the lower portion of the lubricating chamber causes a relatively large rise of the oil level in the oil well 9 since the total area of the oil well 9 is necessarily small and is determined by the quantity of oil which is ordinarily required for the lubrication of the journal 2, i. e., by the required sectional area of the capillary oil feeding means.

In order to cure the above-mentioned difficulties, I have provided an oil-expansion chamber 19 communicating, through one or more slots 21, directly with the oil well 9 in the lower portion of the lubricating chamber 5 and permitting a free communication of the oil therebetween. The primary purpose of the expansion chamber 19 is to increase the total area of the oil level in the supply end of the bearing, thereby decreasing to a minimum the fluctuations attendant upon a displacement of a definite quantity of oil from the oil reservoir 6. The expansion chamber 19 is really an integral part of the lubricating chamber 5, serving merely as an overflow portion from which the waste material 10 is excluded.

As seen in Fig. 3, the communicating passage 7, the oil well 9 and the expansion chamber 19 communicate with each other through slots 8 and 21 respectively, permitting a free communication of the oil between the three spaces while at the same time confining the waste or the capillary oil feeding means 10 to the lubricating chamber 5 only. The latter provision is important since it is necessary to so pack the waste into the chamber 9 as to prevent the overflooding of the oil-supply side of the bearing during the periods when the filling-hole plug 14 is removed for the purpose of filling the oil reservoir 6. I have found that by packing the waste tightly into the lubricating chamber, the amount of oil which will pass into the lubricating chamber during the relatively short interval necessary to fill the oil reservoir, is relatively small and substantially not appreciable.

A flange 23 is provided on the bearing for mounting to an end bracket of a dynamo-electric machine, not shown.

Figure 4:
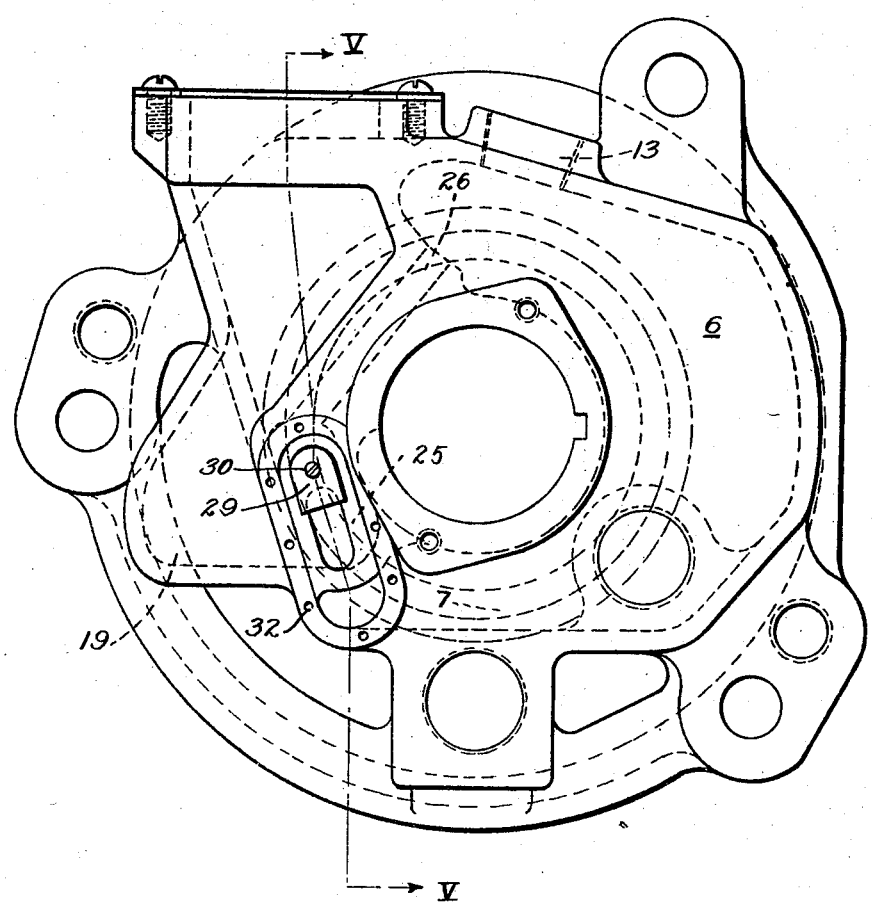
Fig. 4 is an end elevational view of a modified bearing housing illustrating my invention.
Figure 5:
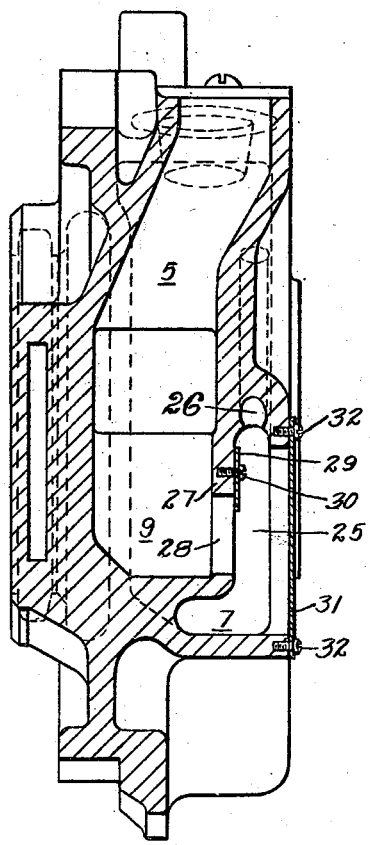
Fig. 5 is a sectional view along the line V—V of the bearing illustrated in Fig. 4.

In Figs. 4 and 5 is shown a modification of my invention wherein I provide, in addition to the expansion chamber 19, another arrangement for securing any desired height of the oil level at the supply end while retaining the same simplicity of construction which characterizes the bearing shown in Fig. 1. The modified construction is of particular importance where the properties of the oil require a shorter lifting height for the capillary oil lifting means than can be provided in the bearing shown in Fig. 1. It is often desired that the oil-supply level shall be higher than the lower edge of the communicating passage 7 between the oil well 9 and the oil reservoir 6.

With the foregoing objects in view, I provide a chamber 25 extending upwardly from the communicating passage 7 of the oil reservoir on the other side of the bearing collar. The upper portion of the chamber 25 communicates with the upper portion of oil reservoir 6 by means of a communicating passage 26 which may be made in a practical manner by drilling a relatively small hole in a solid portion of the bearing housing through the opening which is provided for the filling hole 13.

The oil chamber 25 is separated from the oil well 9 of the lubricating chamber 5 by a common wall 27 and communicates therewith through an oil supply opening 28. The upper level of the oil supply opening is determined by means of a diaphragm 29 which may be secured by means of a screw 30 to the common wall 27 of the oil chamber 25 and the oil well 9. The oil chamber 25 is open at one side permitting an adjustment of the oil-level determining diaphragm 29 and is hermetically enclosed by means of a cover 31 and screws 32.

Figure 6:
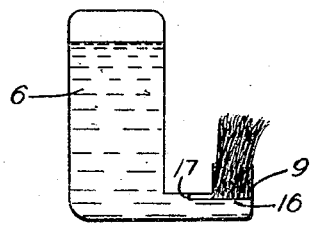
Figs. 6 and 7 are explanatory diagrams illustrating certain principles employed in the construction of the bearings made according to my invention.
Figure 7:
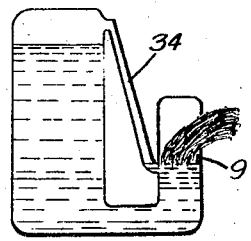

The effects of the hereinabove-described arrangements may be readily understood by considering Figs. 6 and 7. In Fig. 6 is schematically shown a connection between an oil reservoir 6 and an oil well 9, as utilized in the bearing illustrated in Fig. 1. The highest level 16 of the oil in the oil well will be determined by the highest level of the communicating passage between the oil reservoir and the oil well, i. e., by the lower edge of the rib 17. In Fig. 7, the oil well 9 is shown provided also with a channel 34 communicating with the space in the upper portion of the oil reservoir 6. In the latter arrangement, the oil level in the oil well 9 will rise to a height where it seals off the communicating passage 34 leading to the upper portion of the oil reservoir and the oil supply level is thus determined by the highest level of the communicating passage of the channel 34. In my modified bearing construction shown in Figs. 4 and 5, the diaphragm 29 determines the upper level of the communicating passage leading from the oil well 9 to the upper portion of the oil reservoir 6. The diaphragm thus fixes the height of the oil in the oil well 9 independently of the level of the lowest portion of the bearing collar 3.

My invention permits the full realization of a constant oil supply level which is characteristic of the bearing constructions and arrangements illustrated herewith and which may be equally well utilized in connection with other apparatus which is subject to similar difficulties.

Various modifications of my invention will be apparent to those skilled in the art and it is my desire that the appended claims shall cover all modifications and arrangements which come within the scope and spirit of my invention.

I claim as my invention:

1. The combination with a bearing, of means comprising a hermetically closed vessel having an oil-supply opening at its lower portion, a lubricating chamber communicating therewith for receiving oil from said opening and adapted to maintain an oil level corresponding approximately to the top of the lowest portion of said oil-supply opening, capillary fibrous oil-lifting means immersed in the oil in said chamber for feeding oil to said bearing and extending upward from the oil level in said chamber, said lubricating chamber having a partition restricting the space occupied by said capillary oil-lifting means to a portion thereof only, but permitting the free flow of the oil over the entire width of the chamber.

2. A journal bearing comprising a collar surrounding the journal and having a lubricating opening communicating therewith, a lubricator chamber and a hermetically closed oil reservoir adjacent to said collar, said lubricator chamber and said reservoir having a communicating passage for oil in their lower portions, respectively, said lubricating opening communicating with the upper portion of said lubricator chamber, and capillary fibrous oil-lifting means disposed in said lubricator chamber and extending between the oil level and said lubricating opening, said lubricator chamber having a partition restricting the space occupied by said capillary oil-lifting means to a portion thereof only, but permitting the free flow of the oil over the entire width of said lubricator chamber.

3. A journal bearing comprising a collar surrounding the journal and having a lubricating opening communicating therewith, a lubricator chamber extending adjacent to said opening on one side of said collar, a hermetically closed oil reservoir disposed on the other side of said collar and having at its lower portion an extension disposed under the bottom of said collar for communicating with the lower portion of said lubricator chamber, the oil level in said lubricator chamber being dependent upon the highest level of said communicating extension underneath said collar, said lubricating opening being disposed above said oil level, and capillary fibrous oil-feeding means disposed in said lubricating chamber for feeding oil from said oil level to said lubricating opening.

4. The combination with a bearing lubricator, of oil supply means therefor comprising a hermetically closed oil reservoir, a chamber extending upwardly from, and in communication with, the lower portion of said oil reservoir and having an opening communicating with the upper portion of said oil reservoir, an oil receptacle adjacent to said chamber having an opening communicating with said chamber, and oil-lifting means in said oil receptacle.

5. The combination with a bearing lubricator, of oil supply means therefor comprising a hermetically closed oil reservoir, a chamber extending upwardly from, and in communication with, the lower portion of said oil reservoir and having an opening communicating with the upper portion of said oil reservoir, an oil receptacle adjacent to said chamber having an opening communicating with said chamber, adjusting means for varying the highest level of said last-mentioned opening, and means for rendering said adjusting means accessible from the outside.

6. The combination with a bearing lubricator, of oil supply means therefor comprising a hermetically closed reservoir, a closed chamber extending upwardly from the lower portion of said oil reservoir and having in its lower portion an opening communicating therewith, an oil receptacle adjacent to said chamber having an opening communicating with said chamber, the upper level of said first opening being lower than the upper level of said second opening, and means for providing an air-pressure equalizing channel between the upper portions of said chamber and said oil reservoir respectively.

7. The combination with a bearing lubricator, of oil supply means therefor comprising a hermetically closed reservoir, a closed chamber extending upwardly from the lower portion of said oil reservoir and having in its lower portion an opening communicating therewith, an oil receptacle having an opening communicating with said chamber, the upper level of said first opening being lower than the upper level of said second opening, and means for providing an air pressure equalizing channel between the upper portions of said chamber and said oil reservoir respectively and means for adjustably controlling the upper level of the opening leading to said oil receptacle.

8. A journal bearing comprising a collar surrounding the journal and having a lubricating opening communicating therewith, a lubricator chamber extending adjacent to said opening on one side of said collar, a hermetically closed oil reservoir disposed on the other side of said collar and having at its lower portion an extension disposed under the bottom of said collar for communicating with the lower portion of said lubricator chamber, a closed chamber extending upwardly from, and communicating with, said extension and disposed adjacent to said lubricator chamber, said closed chamber having an opening disposed above the upper level of said extension for supplying oil to said lubricator chamber, means for providing an air-pressure equalizing channel between the upper portions of said closed chamber and said oil reservoir, respectively, and capillary oil-feeding means disposed in said lubricator chamber for feeding oil from the oil level of said oil-supply opening to said lubricating opening.

9. A journal bearing comprising a collar surrounding the journal and having a lubricating opening communicating therewith, a feeding chamber extending adjacent to said opening on one side of said collar, a hermetically closed oil reservoir disposed on the other side of said collar and having at its lower portion an extension, a closed chamber extending upwardly from, and communicating with, said extension and disposed adjacent to said feeding chamber, said closed chamber having an opening for supplying oil to said feeding chamber, means for providing an air-pressure equalizing channel between the upper portions of said closed chamber and said oil reservoir, respectively, capillary oil-feeding means disposed in said feeding chamber for feeding oil from the oil level of said oil-supply opening to said lubricating opening, and a second chamber disposed adjacent to said feeding chamber and separated therefrom by a perforated wall for maintaining the same oil level as said feeding chamber while restricting thereto the space occupied by said capillary means.

10. A journal bearing comprising a collar surrounding the journal and having a lubricating opening communicating therewith, a lubricator chamber extending adjacent to said opening on one side of said collar, a hermetically closed oil reservoir disposed on the other side of said collar and having at its lower portion an extension disposed under the bottom of said collar, a closed chamber extending upwardly from, and communicating with, said extension and disposed adjacent to said lubricator chamber, said closed chamber having an opening disposed above the upper level of said extension for supplying oil to said lubricator chamber, a channel member disposed above said collar and extending between the upper portions of said closed chamber and said oil reservoir, respectively, for equalizing the gas pressure therebetween, capillary oil-feeding means disposed in said lubricator chamber for feeding oil from the oil level of said oil supply opening to said lubricating opening, and means for adjusting the height of the opening leading to said lubricator chamber.

11. A journal bearing comprising a collar surrounding the journal and having a lubricating opening communicating therewith, a hermetically closed lubricator chamber extending adjacent to said opening on one side of said collar, a hermetically closed oil reservoir disposed on the other side of said collar and having at its lower portion an extension disposed under the bottom of said collar, a closed chamber extending upwardly from said extension and disposed adjacent to said lubricator chamber, said closed chamber having an opening disposed above the upper level of said extension for supplying oil to said lubricator chamber, a conduit disposed above said collar and extending between the upper portions of said closed chamber and said oil reservoir, respectively, for equalizing the air pressure therebetween, capillary oil-feeding means disposed in said lubricator chamber for feeding oil from the oil level of said oil supply opening and means for adjusting the highest level of the opening leading to said lubricator chamber, one of the walls of said closed chamber comprising a tight-fitting removable member for providing access to said level-adjusting means.

In testimony whereof, I have hereunto subscribed my name this 29th day of October 1923.

CLAUDE BETHEL.